Figure 1:
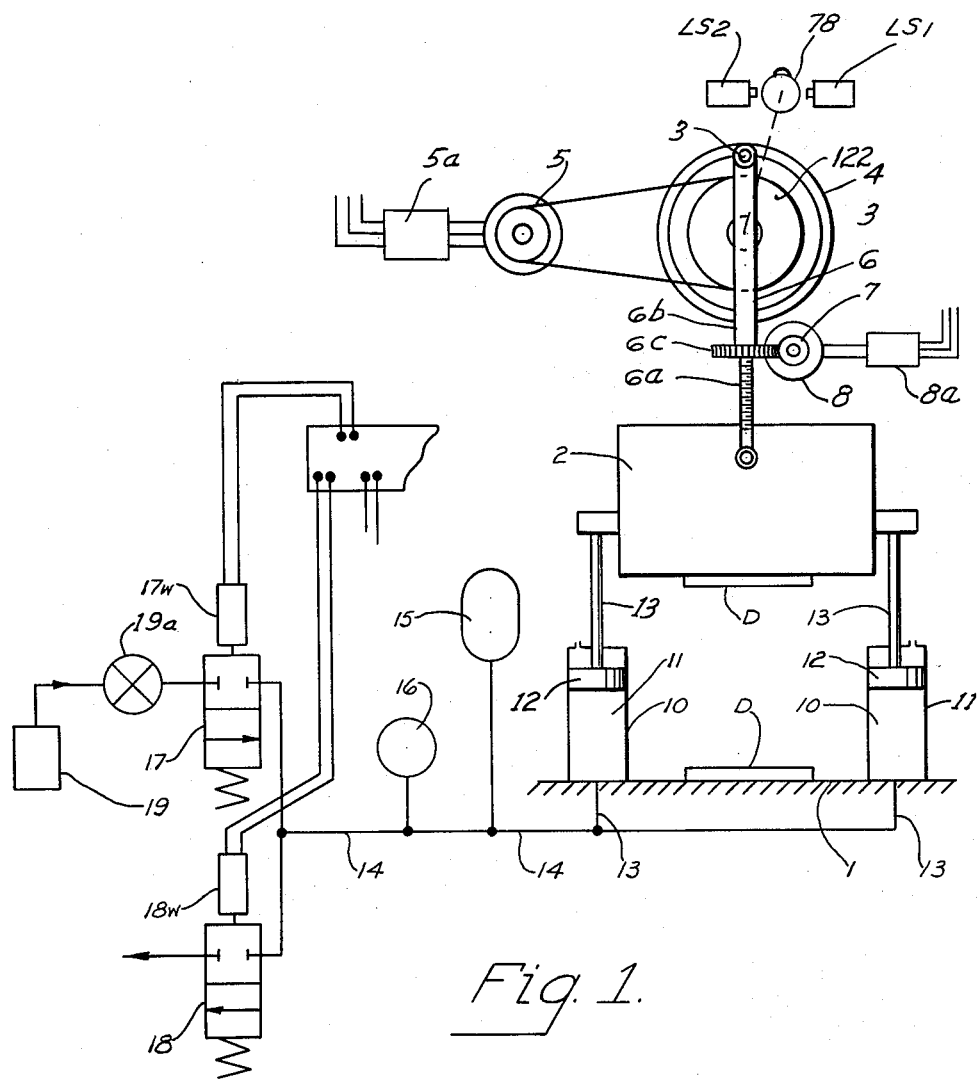

Dec. 24, 1963 V. W. STIMMEL 3,115,086
AUTOMATIC CONTROL FOR PNEUMATIC COUNTERBALANCE
OF MECHANICAL PRESS
Filed Nov. 27, 1962 2 Sheets-Sheet 1

INVENTOR.
Vincent W. Stimmel,
BY
John H. Leonard,
his ATTORNEY.

INVENTOR.
Vincent W. Stimmel
BY John H. Leonard
his ATTORNEY.

United States Patent Office 3,115,086
Patented Dec. 24, 1963

3,115,086
AUTOMATIC CONTROL FOR PNEUMATIC COUNTERBALANCE OF MECHANICAL PRESS
Vincent W. Stimmel, Shorewood, Wis., assignor to Square D Company, Park Ridge, Ill., a corporation of Michigan
Filed Nov. 27, 1962, Ser. No. 240,364
8 Claims. (Cl. 100—48)

This invention relates to an apparatus for automatically controlling balancing systems of reciprocable motion machines.

For purposes of illustration, the apparatus is shown as applied to a pneumatic counterbalance system of a motor driven metal forming press for automatically adjusting the air pressure in the counterbalance system to maintain the motor drive power more nearly uniform during the work and return strokes of the arm, so as to reduce motor current surges and mechanical stresses to a minimum. The applications of the apparatus to other mechanisms will be apparent from the illustrative example.

Mechanical forming presses, which perform a drawing, forging, or punching operation on a metal workpiece, generally include a stationary bed and vertically reciprocable ram. Complementary dies are mounted on the bed and ram, forming of the metal is effected by driving the ram downwardly to cause cooperation of its die with the die on the bed, and then returning the ram upwardly for opening the dies.

Generally, the power for reciprocating the ram is supplied by an electric motor which may be coupled by a V-belt, or other suitable means, to a large flywheel. The flywheel is driven continuously and is selectively coupled to a crankshaft by suitable clutch means so that the crankshaft may be driven by the flywheel for driving the ram on its work and return strokes.

The ram is operatively connected to the crankshaft by means of one or more adjustable connecting rods so that, although the stroke of the press is constant, being determined by eccentricity of the crank, the position of the ram and its die along the working path can be changed by effectively lengthening or shortening the connecting rods. The rods are lengthened and shortened, selectively, by means of a motor driven adjustment.

The work cycle of the mechanical press is initiated by engaging the clutch, thereby coupling the rotating flywheel to the drive mechanism of the crankshaft and causing the ram to move in the downward direction until maximum travel has been reached and then return in the upward direction until it reaches its uppermost position, whereupon the clutch is disengaged from the flywheel drive. The press is ready then for initiation of a subsequent cycle of operation.

With heavy dies and rams, the inertial accelerating and decelerating forces resulting from ram operation become enormous. The purpose of the present invention is to counterbalance the ram and die and counteract these inertial forces. It may be seen that, on the downstroke, the force of gravity, acting on the ram and its die, is in a direction to aid rotation of the heavy driving system, and acceleration of the ram on its downward stroke. Conversely, on the return stroke, the weight of the ram and its die act in opposition to the forces supplied by the driving system and thus in a direction to decelerate the return movement of the ram. Thus, without means for counteracting the combined inertial forces, the drive motor and its associated mechanism would be subjected to varying stresses in supplying varying amounts of driving torque during each cycle of press operation. Consequently, in the absence of a counterbalance system, the press either must be operated too slowly or it and its transmission will be subjected to excessive wear and strain which imposes on the motor increased heating and the possibility of burning out.

To counteract the effects of the combined inertial forces of the ram and its die and driving mechanism, the practice is to provide one or more air-balancing piston and cylinder assemblages operatively connected to the press. In the illustrative example, the piston of the assemblages are connected to the ram and the cylinders are connected to the press frame. The assemblages are arranged so that the air in the assemblages is compressed on the downstroke of the ram, and expands on the return stroke. Consequently, the balancing air pressure constantly varies between a maximum pressure at the bottom dead center position of the ram and a minimum pressure at the top dead center position of the ram. Thus, as the ram and die are accelerated on their working or downstroke, the pressure is built up in the counterbalance system to offset the weight of the ram and its die. As the ram and die return from their lowermost position on the return stroke, the pressure built up in the counterbalance system on the downstroke becomes effective to assist in returning the ram and its die, and thereby to overcome their resistance to reciprocation in a direction opposite from their work stroke. Since the size of dies, speed of operation, length of stroke, and the like differ for different operations, the counterbalancing effect must be subject to corresponding variations, and must be capable of control.

It is desirable, if the power requirements of the downstroke are to be substantially the same as the power requirements of the return stroke, that the counterbalance pressure in the system be such that at 90 degrees crank rotation, and at 270 degrees crank rotation, the ram and die are essentially balanced by the total air pressure and so have no effective weight insofar as energy is required to move the ram down and up out of these positions, respectively. If the counterbalance pressure is in excess of the desired pressure, then, on the downstroke, the motor must supply excessive torque to overcome the excess pressure and drive the ram and its die downwardly. If, on the other hand, the counterbalance pressure is below the desired amount, then, as the ram returns, the expansive pressure of the air is inadequate, and the motor drive must exert excessive torque to return the ram and its die to their uppermost position.

Indeed, if the pressure in the counterbalance cylinder is in excess of that required for normal operation, the drive motor must exert sufficient torque to overcome the excess pressure as the ram is driven on the downstroke.

In supplying the torque necessary to overcome the excessive counterbalance system pressure, the motor momentarily draws an excessive operating current. Consequently, on the return stroke, the forces caused by the expansion of the air in the counterbalance cylinders overcompensate for the ram and die weight and tend to accelerate the ram on the return stroke. Consequently, the drive motor requires less than the normal amount of currents to return the ram to its uppermost position. Likewise, if the counterbalancing pressure is less than that required for normal operation, the motor draws little current on the downstroke, and since there is inadequate counterbalancing pressure to aid in lifting the ram, the motor draws excessive operating current on the return stroke. Thus, it may be seen when the counterbalance pressure is maladjusted the drive motor is subjected to current surges and the press structure is subjected to mechanical stress.

With the foregoing knowledge of the mechanical press and pneumatic counterbalances, and motor operation, it may be seen that by sensing motor current at 90 degrees and 270 degrees crank rotation, it may be determined whether the motor is being called upon to supply excessive torque to compensate for a maladjusted counterbalance pressure.

In accordance with the present invention, the motor current is sampled at approximately 90 degrees and 270 degrees of crank rotation from fully raised position. If, at 90 degrees, the motor current exceeds a predetermined normal magnitude it is evident that the counterbalance pressure may be too high. In accordance with the present invention, as hereinbefore described, excessive current causes a bleed or blow-down valve to open, thereby discharging to the atmosphere a portion of the trapped air in the counterbalance cylinders. A similar current sensing is made at the 90 degrees crank rotation on each subsequent cycle to determine if the amount of air in the counterbalance cylinders has been brought to normal. If the proper amount of air has not been blown off, the valve is again caused to operate so that an additional amount of air is discharged to the atmosphere. The same valve operation is repeated on successive strokes of the press until the motor current at 90 degrees is reduced to the predetermined value required, thus evidencing that the proper amount of air is present for counterbalancing. If, at 270 degrees of crank rotation, the motor current exceeds the predetermined value, thus evidencing a counterbalance pressure below normal and an excess torque requirement to lift the ram, then, in accordance with the present invention, an admission valve is caused to open, thereby admitting additional air under pressure into the counterbalance cylinders. On subsequent press cycles, the motor current is repeatedly sampled at the 270 degrees of crank rotation to determine if enough air has been admitted to the counterbalance cylinders. If sufficient air has not been admitted, the admission valve operation is repeated until the drive motor current on the lift stroke is reduced to the predetermined normal value, thus evidencing that the proper amount of air is in the counterbalance assemblages. Due to the volumetric capacity of the pneumatic system, the pressure in the system changes sufficiently slowly so that the duration of admission or blow-down of air does not over-correct or over-compensate.

An object of the present invention is to provide an improved method and apparatus whereby the air pressure in an air counterbalance system of a power driven reciprocating member of a machine is automatically and continuously sampled and regulated to assure at all times a condition wherein the energy required to operate the member is substantially equal during both the forward and the return strokes of the member.

A further object is to provide a controller for automatically adjusting the counterbalance effect while the member is being reciprocated.

A more specific object is to provide a fully automatic electrically controlled adjustable counterbalance effect while the member is being reciprocated.

Another specific object is to provide a fully electrically controlled automatically adjustable counterbalancing means for an upright motor driven mechanical forming press.

A further object is to provide a fully automatic electric controller for adjusting the counterbalance system of an electrically driven reciprocating mechanism press which controller depends for its operation on variations in the current drawn by the electric drive during the press operation.

Another object is to provide a controller for the pneumatic counterbalancing system of a press which controller also functions as a fail-safe device to interrupt press operation in the event of malfunctioning of the press.

Figure 2:
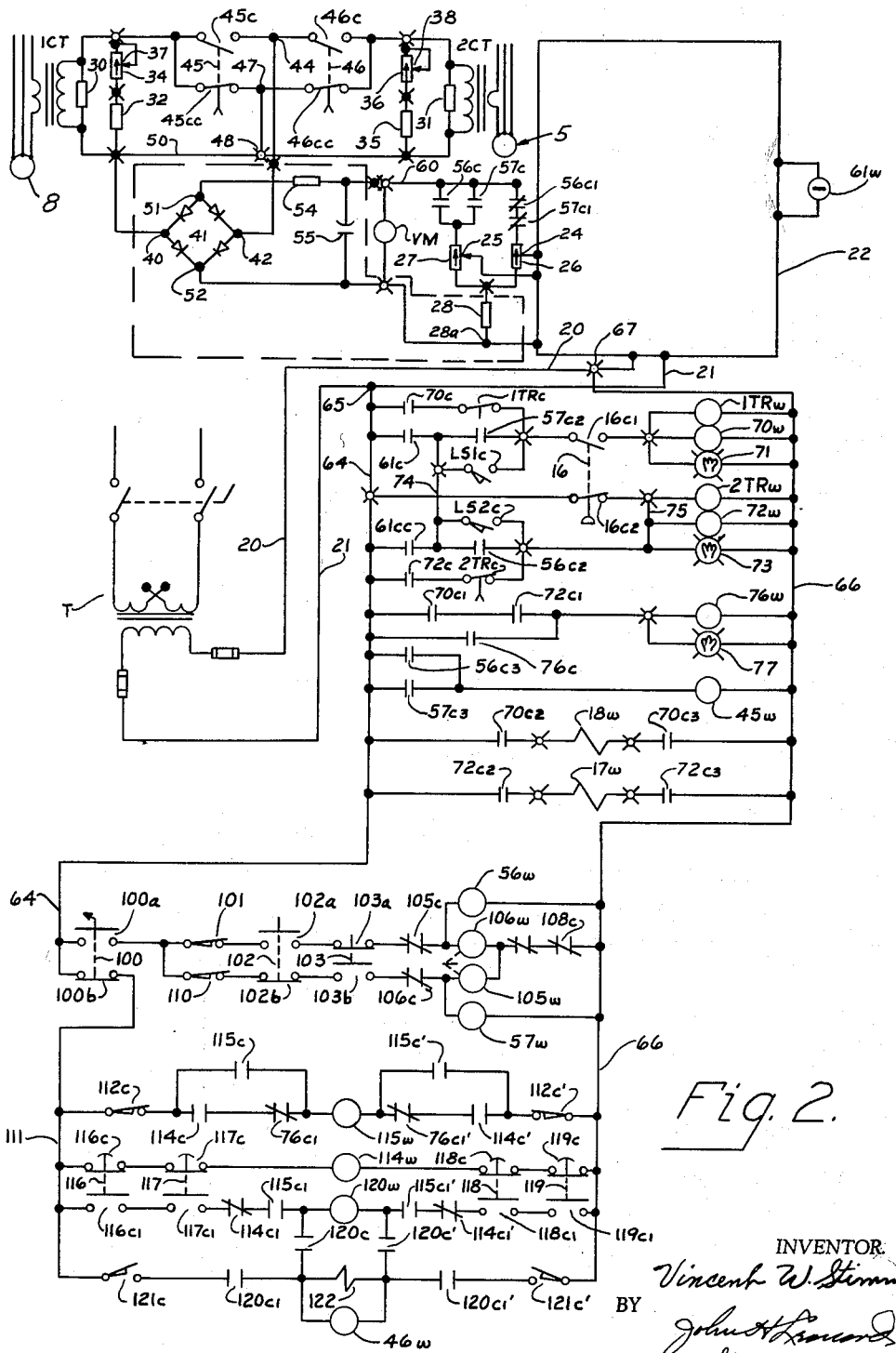

Further objects and advantages of the invention will become apparent from the following description in which reference is made to the drawings illustrating a preferred embodiment of the invention, and in which:

FIG. 1 is a schematic diagram of an electric motor driven upright forming press having a pneumatic counterbalance, and combined with the controller of the present invention; and FIG. 2 is a schematic diagram of the electrical circuit of the controller.

Referring to FIG. 1, there is illustrated diagrammatically a conventional press having a bed 1, a vertically reciprocable ram 2 with conventional companion dies D arranged one on the bed and one on the ram. The ram is driven by means of a crankshaft 3 connected by suitable clutch means, not shown, to a flywheel 4 which, in turn, is driven by a main driving motor 5 which may be controlled by a motor controller 5a. The crank is connected to the ram by an elongatable and contractible connecting rod 6 which has a threaded screw portion 6a in threaded engagement with an internally threaded sleeve 6b. The screw is rotatably driven by means of a gear 6c which, in turn, is driven by a worm 7 on the shaft of an adjusting motor 8 which is controlled by a motor controller 8a, all in a well known manner.

The counterbalancing means of the press is shown as two pneumatic piston and cylinder assemblages 10, each having a cylinder 11 in which a piston 12 is reciprocable parallel to the path of the ram. Preferably each piston is connected by a rod 13 to the ram 2 and the cylinder is connected to the frame. In the form illustrated, the cylinders 11 are open at the rod end so as to vent the air at the rod end of the piston. At the head ends they are connected in parallel by pipe lines 13 to an air line 14 to which is connected to surge tank 15 and a pressure switch 16. Connected in parallel to the line 14 are solenoid operated cut-off valves 17 and 18, respectively. The valves 17 and 18 have operating windings 17w and 18w, respectively. Each valve is a two-position valve having a closed position in which it seals the line 14, and an open position. In the open position of the valve 17, air under pressure is supplied to the line 14 from a pressure source 19. In the open position of the valve 18, the line 14 is vented to the atmosphere. A cut-off valve 19a may be provided if desired, for cutting off the pressure source 19 for purposes of servicing the equipment.

Referring next to FIG. 2, a preferred form of the controller of this invention is shown in detail. For the purpose of facilitating following the control circuit, in most instances, the individual relays and contactors used therein are schematically illustrated and are described with reference to their operating coils or windings and respective contacts. Each relay coil or winding carries a numeral suffixed by "w," and each of the contacts operated thereby carries the same numeral with a different suffix. For referring to a relay in its entirety, the numeral alone is used for brevity though the numeral alone does not appear in the drawings.

The controller includes a suitable source of control current, which may be a transformer T. Conductors 20 and 21 are connected to a conventional amplifier 22 for energization of the amplifier by the source. Also connected to the amplifier 22 are adjustable taps 24 and 25 of resistors 26 and 27, respectively. In addition, one terminal 28a of a resistor 28 is connected to the amplifier 22. A pair of current transformers, 1CT and 2CT, connected in the motor control circuits, respectively, so that each is responsive to the current taken by one phase of its associated motor, have their secondaries connected across resistors 30 and 31, respectively. Across the secondary of current transformer 1CT is further connected the series combination of a resistor 32 and a potentiometer 34. Connected across the secondary of current transformer 2CT is a series combination of a resistor 35 and a potentiometer 36. The potentiometers 34 and 36 have adjustable taps 37 and 38, respectively, each of which is connected to the common terminal of its respective potentiometer and current transformer.

An input terminal 40 of a rectifier bridge 41 is connected to the resistor 32, the resistor 30, and other terminal of the current transformer 1CT, at their common junction. Another input terminal 42 of the rectifier bridge 41 is connected to a common interconnection 44 of normally open contacts 45c and 46c, of time delay relays 45 and 46, respectively. The contact 45c is connected between the interconnection 44 and the adjustable tap 37. The contact 46c is connected between the interconnection 44 and the adjustable tap 38. The relays 45 and 46 also have normally closed contacts 45cc and 46cc, respectively. A series connected combination of contacts 45cc and 46cc is connected across the series combination of contacts 45c and 46c. At a point 47 between contacts 45cc and 46cc, these contacts have a common electrical connection to a point 48 on a conductor 50 which interconnects those ends of resistors 32 and 35 which are connected to the transformers, respectively, so that the point 48 is between the resistors 32 and 35. The rectifier bridge 41 has output terminals 51 and 52 which are connected to a filter network, including a resistor 54 and a capacitor 55. The terminal 51 of the rectifier bridge 41 is connected to one end of resistor 54. The terminal 52 of the rectifier bridge 41 is connected to the other end of the resistor 54 through the capacitor 55. The resistor 28 has its terminal 28a electrically connected to the capacitor 55 and the terminal 52 and its other terminal connected to a common junction of one of the terminals of each of the resistors 26 and 27. The other terminal of the resistor 27 is connected to a common interconnection of normally open contacts 56c and 57c of relays 56 and 57, respectively. The relay 56 also has normally open contacts $56c_2$ and $56c_3$. The relay 57 also has normally closed contacts $57c_1$ and normally open contacts $57c_2$ and $57c_3$. The contacts 56c and 57c are connected, respectively, to a conductor 60 which conductor is electrically connected to the resistor 54 and capacitor 55 at their common interconnection. The normally closed contacts $56c_1$ and $57c_1$ are serially connected with each other between the conductor 60 and the other terminal of the resistor 26. A voltmeter VM is connected across the capacitor 55. The amplifier 22 has output terminals connected across and energizing the operating winding $61w$ of a relay 61.

Connected across the conductors 20 and 21 for energization thereby is a control circuit including a conductor 64 connected at 65 to conductor 21 and a conductor 66 connected at 67 to conductor 20.

A normally open contact 61c, a normally open contact $57c_2$, a contact $16c_1$ of minimum pressure switch 16, and the operating winding $70w$ of a relay 70 are connected in series across conductors 64 and 66. The relay 70 has normally open contacts $70c$, $70c_1$, $70c_2$, and $70c_3$. Connected in parallel with, and across the series combination of the contacts 61c and $57c_2$ is a series combination of the contact $70c$ and a $1TRc$ of a time delay relay 1TR. The relay 1TR has an operating winding $1TRw$ which is connected in parallel with the winding $70w$. Also, connected in parallel with the operating winding $70w$ is a signal lamp 71. A contact $LS1c$ of a limit switch LS1 is connected across the contact $57c_2$. Contacts $61cc$, $56c_2$, and an operating winding $72w$ are serially connected across the conductors 64 and 66. The relay 72 has normally open contacts $72c$, $72c_1$, $72c_2$ and $72c_3$. A signal lamp 73 is connected in parallel with the operating winding $72w$. Connected in parallel with the contact $56c_2$ is a contact $LS2c$ of the limit switch LS2. A conductor 74 is electrically connected between the common junction of contacts 61c and $57c_2$ and the common junction of contacts $61cc$ and $56c_2$. A normally closed contact $16c_2$ of the minimum pressure switch 16 is serially connected with the operating winding $2TRw$ of the time delay relay 2TR and this series combination is connected across the conductors 64 and 66. A current carrying conductor 75 is electrically connected between the common junction of contacts $16c_2$ and operating winding $2TRw$ and the common junction of contact $56c_2$ and winding $72w$. The contacts $70c_1$ and $72c_1$ and an operating winding $76w$ of a relay 76 are serially connected across conductors 64 and 66. A normally open contact $76c$ of the relay 76 is connected in parallel with the series combination of the contacts $70c_1$ and $72c_1$. A warning lamp 77 is connected across the winding $76w$. The relay 76 also has normally closed contacts $76c_1$ and $76c_1'$. The contact $56c_3$ is connected in parallel with the contact $57c_3$. Also connected in series across the conductors 64 and 66 is a circuit including the contact $70c_2$, blowdown valve operating winding $18w$ and contact $70c_3$. In similar fashion, the contact $72c_2$, admission valve operating winding $17w$ and contact $72c_3$ are serially connected across conductors 64 and 66. The limit switches LS1 and LS2 are self-restoring and are operated by a cam 78 which is co-rotatable with the crankshaft so that LS1 closes momentarily at approximately 90 degrees of crank rotation and LS2 closes momentarily at approximately 270 degrees crank rotation.

Connected in series across the conductors 64 and 66 are, in the order enumerated, a contact $100a$ of a two position selector switch 100 having selectively closed contacts $100a$ and $100b$, a normally closed "up" limit switch contact 101, a normally open contact $102a$ of a push button 102 having also a normally closed contact $102b$, a normally closed contact $103a$ of a push button 103 having also a normally open contact $103b$, a normally closed contact $105c$ of a contactor 105 having an operating winding $105w$, an operating winding $106w$ of a contactor 106 having a normally closed contact $106c$, and a pair of overload relay contacts $108c$. An operating winding $56w$ of the relay 56 is electrically connected between conductor 66 and the common junction of the contact $105c$ and the operating winding $106w$. Electrically connected between the common junction of contacts $100a$ and 101 and the common junction of contact $108c$ and the operating winding $106w$ is a series circuit including, in the order recited, a normally closed contact 110 of a "down" limit switch, the normally closed contact $102b$ of the push button switch 102, the normally open contact $103b$ of the push button switch 103, the contact $106c$, and the operating winding $105w$. An operating winding $57w$ is connected between the conductor 66 and the common junction of contact $106c$ and the operating winding $105w$.

A second contact $100b$ of the two position selector switch 100 is interposed between, and electrically connects, the conductor 64 and a conductor 111. Connected in series across the conductors 111 and 66 are, in the order recited, a normally closed limit switch contact $112c$, a normally open contact $114c$ of a relay 114 having a normally open contact $114c'$ and an operating winding $114w$, a normally closed contact $76c_1$, an operating winding $115w$ of a relay 115 having normally open contacts $115c$ and $115c'$, a normally closed contact $76c_1'$, a normally open contact $114c'$, and a normally closed limit switch contact $112c'$. The contact $115c$ of relay 115 is connected in parallel with the series combination of contacts $114c$ and $76c_1$. Similarly, the contact $115c'$ is connected across the series combination of contacts $76c_1'$ and $114c'$. When closed, the contacts $115c$ and $115c'$ provide a holding circuit for the operating winding $115w$ of relay 115.

Serially connected between the conductors 111 and 66 are a pair of normally closed contacts $116c$ and $117c$ of push buttons 116 and 117, respectively, the operating winding $114w$, and a pair of contacts $118c$ and $119c$ of push button switches 118 and 119, respectively. The operating winding $114w$ is interposed between the pair of contacts $116c$ and $117c$ and the pair of contacts $118c$ and $119c$. Serially connected between the conductors 111 and 66, are, in the order recited, a normally open contact $116c_1$ of the push button switch 116, a normally open contact $117c_1$ of the push button switch 117, the normally closed contact $114c_1$, the normally open contact $115c_1$, an operating winding $120w$ of a relay $120$ having contacts $120c$, $120c'$, $120c_1$ and $120c_1'$, the normally open contact $115c_1'$, the normally closed contact $114c_1'$, a normally open contact $118c_1$ of the push button switch $118$, and a normally open contact $119c_1$ of the push button switch $119$.

A normally open limit switch contact $121c$, the contact $120c_1$, a clutch operating solenoid $122$, the contact $120c_1'$, and a normally open limit switch contact $121c'$ are serially connected across the conductors $111$ and $66$. An operating winding $46w$ of the time delay relay $46$ is connected across the clutch energizing solenoid $122$ for energization concurrently therewith. The contact $120c$ is electrically connected between the common junction of contact $115c_1$ and operating winding $120w$ and the common junction of contact $120c_1$ and solenoid $122$. Similarly, the contact $120c'$ is electrically connected between the common junction of the contact $115c_1'$ and operating winding $120w$ and the common junction of contact $120c_1'$ and solenoid $122$.

Operation

Considering now the operation of the automatic control system, when it is desired to ready the mechanical press and pneumatic counterbalance and the automatic control for operation, energization of conductors $20$ and $21$ is effected by a source of power connected to the amplifier $22$ and the conductors $64$ and $66$ in a stand-by circuit ready for operation. In this stand-by mode, the control system may be in a condition as depicted in FIG. 2. The minimum pressure switch $16$ has a set of control contacts, not shown, in the drive motor controller $5a$ of FIG. 1 which prevents the motor from being energized if the counterbalance air pressure is below the minimum pressure settings of the pressure switch $16$. Additionally, if the counterbalance system pressure is below the minimum desired pressure, the pressure switch $16$ will have its contact $16c_2$ closed as is shown in FIG. 2. Closure of the contact $16c_2$ energizes the winding $72w$ of relay $72$ thereby closing contacts $72c_2$ and $72c_3$ permitting energization of admission valve operating winding $17w$ and consequent opening of the valve $17$ to permit admission of air into counterbalance cylinder $10$ from the source $19$. When a sufficient amount of air has been admitted into the counterbalance cylinders the pressure switch $16$ causes its contacts $16c_2$ to open thereby deenergizing the relay $72$ which results in closure of the admission valve $17$. Thus it is seen that the drive motor cannot be started if the counterbalance pressure is below the minimum desired pressure and that the counterbalance system controller, when energized on stand-by will cause sufficient air to be admitted to the counterbalance cylinders and to bring the pressure in the cylinders $10$ to the minimum desired value.

Prior to energization and engagement of the clutch to operate the ram on its down stroke, the contact $100b$ of the selector switch $100$ must be in its closed position. When the contact $100b$ of selector switch $100$ is closed, the contact $100a$ is open and, consequently, the ram adjustment motor $8$ cannot be operated concurrently with the operation of the clutch. During the stand-by condition, the operating winding $114w$ of relay $114$ is energized through the closed contacts $116c$, $117c$, $118c$, and $119c$ of push button switches $116$, $117$, $118$, and $119$, respectively. Energization of the winding $114w$ and consequent closure of its associated contacts $114c$ and $114c'$ causes energization of the operating winding $115w$ through a circuit between the conductors $111$ and $66$, and including the normally closed contacts $112c$, $76c_1$, $76c_1'$ and $112c'$. Energization of the winding $115w$ causes closure of its associated contacts $115c$ and $115c'$ which establish a holding circuit for the winding $115w$. Concurrently with the operation of the contacts $115c$ and $115c'$, energization of the winding $115w$ causes the closure of the contacts $115c_1$ and $115c_1'$ which are in series with the operating winding $120w$. The winding $114w$, when energized, also causes its associated normally-closed contacts $114c_1$ and $114c_1'$ to open, thereby to prevent the energization of winding $120w$ by maintaining an open circuit between each of the terminals of the winding $120w$ and the conductors $111$ and $66$, respectively. When the stand-by circuit has been established as explained, the controller may be energized for operation of the clutch. The mechanical press is now ready for operation through one of its work cycles.

It is to be noted that when the motor $5$ is connected for energization to a source of power by means of the controller $5a$, rotation of the motor armature causes the flywheel $4$ to be rotated continuously. When it is desired to cause movement of the ram on its downstroke, a solenoid-operated clutch means, not shown, is utilized to connect the flywheel $4$ to the crankshaft $3$ and thereby to supply driving force to the ram $2$ through the connecting rod $6$ to cause movement of the ram $2$ in a downward direction. As the ram $2$ moves on its downstroke, the counterbalance pistons $12$ are also driven downwardly in the counterbalance cylinder $10$ in a path parallel to the path of the ram $2$. Thus as the ram $2$ is driven on its downstroke, pressure in the counterbalance cylinders $10$ increases to offset the weight of the ram $2$ and its associated die. If the pressure in the counterbalance system is at the proper amount to properly counteract the weight of the ram, then the energy required to operate the mechanical press during both the down and return strokes of the ram $2$ will be substantially equal and no corrective action will be taken by the automatic controller.

To render the clutch active, the push button switches $116$, $117$, $118$, and $119$ must be all simultaneously depressed. The controller incorporates a plurality of push buttons, as shown in the drawings, in order that the operator be required to use both hands to cause operation of the clutch of the punch press, thereby safeguarding him from injury by the press mechanism. When the push button switches $116$, $117$, $118$, and $119$ are simultaneously depressed, their normally closed contacts $116c$, $117c$, $118c$, and $119c$, respectively, are opened to interrupt the circuit which has permitted energization of the winding $114w$ during the stand-by mode. Interruption of the circuit to the winding $114w$ causes closure of its associated contacts $114c_1$ and $114c_1'$. Depression of the push button switches $116$, $117$, $118$, and $119$ has caused their normally open contacts $116c_1$, $117c_1$, $118c_1$ and $119c_1$, respectively, to close, thereby completing a circuit for energization of the operating winding $120w$ through the now closed contacts $114c_1$ and $114c_1'$ and the contacts $115c$, and $115c_1'$ which were caused to close in the stand-by mode. Energization of the winding $120w$ causes its associated contacts $120c$, $120c_1'$, $120c_1$ and $120c_1'$ to close. Closure of the contacts $120c$ and $120c'$ causes energization of the clutch operating solenoid $122$, thereby causing engagement of the clutch means to permit operation of the punch press.

The limit switch $121$ is so arranged that its normally-open contacts $121c$ and $121c'$ are caused to close during approximately $120$ through $330$ degrees of crank rotation. The limit switch $112$ is so arranged that its normally-closed contacts $112c$ and $112c'$ are caused to open momentarily at approximately $270$ degrees of crank rotation. Because the limit switch contacts $121c$ and $121c'$ are not caused to close until approximately $120$ degrees of crank rotation, the operator must continue to hold the push button switches $116$, $117$, $118$, and $119$ depressed in order to maintain continued energization of the clutch operating solenoid $122$. When the limit switch contacts $121c$ and $121c'$ close, the operator may release the push buttons and the energization of the operating windings $120w$ and $46w$ and the clutch operating solenoid $122$ will be maintained through a circuit including the limit switch contacts $121c$ and $121c'$ and the contacts $120c_1$ and $120c_1'$.

The purpose of the limit switch contacts $112c$ and $112c'$ is to insure that the punch press cannot be operated through successive rotational cycles unless the operator releases the push button switches 115 through 118 at the end of each cycle of press operation. When, at approximately 270 degrees of crank rotation, the contacts 112c and 112c' are caused to open, the circuit to the winding 115w is interrupted thereby causing the contacts 115c, 115c', $115c_1$ and $115c_1'$ to open. The opening of the contacts $115c_1$ and $115c_1'$ does not affect energization of the clutch operating solenoid 122 during this interval since the now closed limit switch contacts 121c and 121c' complete a circuit to the windings 46w and 120w and the clutch operating solenoid 122. If the operator has continued to hold the push button switches depressed, past the portion of the operating cycle where the limit switch contacts 112c and 112c' are open, the relay 115 will be deenergized. Shortly before the press rotates to 360 degrees, the limit switch contacts 121c and 121c' open to interrupt energization of the clutch operating solenoid 122 and the windings 120w and 46w. Because the contacts $115c_1$ and $115c_1'$ were caused to open when the limit switch contacts 112c and 112c' were open, there is no circuit closed to the operating winding 120w or the clutch operating solenoid 122. Before the press can be operated on its next stroke, the push button switches 115 through 118 must be released, thereby to permit energization of the windings 114w and 115w. Concurrently with the engagement of the clutch means, at which time the ram begins its downstroke, the operating winding 46w of time delay relay 46 is energized through the circuit including the contacts 120 and 120c'. Energization of the winding 46w causes its associated contacts 46c and 46cc to operate so that contact 46c closes and contact 46cc opens.

Closure of contact 46c impresses a signal from current transformer 2CT across the input terminals 40 and 42 of rectifier bridge 41. The signal appearing at input terminals 40 and 42 is proportional to the power being drawn by the drive motor 5. The signal at output terminals 51 and 52 of the bridge rectifier 41 is therefore a signal of substantially direct current having a voltage proportional to current being drawn by the main motor 5. This output signal is filtered by the filter network consisting of resistor 54 and capacitor 55 and appears as a voltage signal across voltmeter VM. Because relays 56 and 57 have not operated, the voltage signal also appears across the combination of potentiometer resistor 26 and resistor 28. During normal operation of the press, relays 56 and 57 do not operate so that potentiometer 26 detects current flow through the current transformer 2CT. Relays 56 and 57 are operative only when the ram adjustment motor 8 is to be energized for press adjustment. The signal now appearing between the tap 24 of potentiometer 26 and point 28a is supplied as an input to the amplifier 22.

The specific configurations of the amplifier 22 are not important in that in itself it does not form a part of the present invention. The amplifier 22 is a conventional amplifier which, in the present embodiment, need merely accept the signal appearing at tap 24 and point 28a and, if the signal exceeds a certain magnitude, causes energization of the operating windings 61w of relay 61. Tap 24 of resistor 26 is adjustable so that the signal magnitude at which the amplifier 22 causes operation of relay 61 may be selectively determined. Thus it may be seen that relay 61 is caused to operate whenever the current drawn by drive motor 5 exceeds a predetermined magnitude.

As previously mentioned, relay 46 is a time delay relay which has a delay in closing its contacts to allow press operation to begin before current is sensed. This will eliminate the sensing of high motor starting currents. Whenever the motor draws an excessive amount of current thereby causing operation of the relay 61 and consequent closure of the contacts 61c and 61cc, a circuit is partially set up for energization of operating windings 70w or 72w to cause blow down or admission of air to the pneumatic counterbalance system, respectively. Limit switch contacts $LS_1c$ and $LS_2c$ are preferably arranged to be closed momentarily at 90 degrees and 270 degrees of crank rotation, respectively. Thus if, at 90 degrees of crank rotation, the current being drawn by the drive motor 5 is excessive a circuit will be established through the now closed contact 61c, limit switch contact $LS_1c$, and contact $16C_1$ of pressure switch 16 to cause energization of operating winding 70w.

Because the limit switch contact $LS_1c$ will open shortly after 90 degrees of crank rotation, a circuit is required to hold in the operating winding 70w of relay 70. This circuit is established by contact 70c and contact 1TRc, which are in parallel with contacts 61c, and $LS_1c$. Energization of operating winding 1TRw of time delay relay 1TR concurrently with operating winding 70w because of their parallel connection causes contact 1TRc to open at the predetermined time interval after energization of winding 1TRw. The timer contact 1TRc has a delayed opening after energization so that a holding circuit is complete for a predetermined time to the operating winding 70w of the relay 70. During the predetermined time that the operating winding 70w is energized, the contacts $70c_2$ and $70c_3$ are closed to cause energization of the operating winding 18w of blow down valve 18 of FIG. 1. In this manner, if at 90 degrees of crank rotation an excess motor current is being drawn, the blow down valve 18 will be opened for a predetermined time interval to relieve to the atmosphere a portion of air from the counterbalance cylinders 10. If, on the return stroke of the press, at 270 degrees the main motor current is in excess of a predetermined value thereby causing energization of the operating winding 61w of relay 61, a circuit will be established through contact 61cc and the momentarily closed limit switch contact $LS_2c$ to energize operating winding 72w and cause consequent closure of contacts $72c_2$ and $72c_3$. The closure of contact $72c_2$ and $72c_3$ causes energization of operating winding 17w of admission valve 17 and consequent admission of air from the source 19 to the counterbalance cylinders 10. Energization of operating winding 2TRw of time delay relay 2TR having a timer contact 2TRc causes a holding circuit to be established to permit continued energization of winding 72w through the now closed contact 72c for a predetermined time. The blow down and admission control relays each has signal lamps 71 and 73, respectively, connected in parallel therewith to provide visual indicating means during the time when air is admitted to or released from the counterbalance system.

The following description shows that on the occurrence of selective drive motor currents at 90 degrees of crank rotation air will be released from the counterbalance system and, similarly, on the occurrence of excessive motor currents at 270 degrees crank rotation air will be admitted to the counterbalance system. It should be noted that, under normal conditions of press operation, the motor will not draw excessive currents in both the downstroke and return stroke; that is, at both 90 degrees and 270 degrees when the current sampling operation can cause energization of the blow down or admission valve relays. This may be further understood by noting that if the counterbalance cylinder pressure is in excess of that required for normal operation, the motor current will be excessive only on the downstroke since, on the return stroke, the excess pressure will aid in returning the ram to its uppermost position. Conversely, if the pressure in the counter-balance cylinder is below that required for optimum operation, the motor will draw excessive current only on the return stroke. Thus, unless mechanical difficulties such as an overheated or burned out bearing or tight gibs exist, only one pressure corrective function will occur during a single stroke of the press operation.

If the control is maladjusted or if mechanical difficulties occur in the press drive mechanism which cause the motor to draw excessive currents on both the downstroke and return stroke, then relays 1TR and 2TR will cause energization of relays 70 and 72 concurrently. If relay 61 is energized during both the downstroke and return stroke of the press, the closure of contacts $70c_1$ and $72c_1$ will complete the circuit to operating winding $76w$ of relay 76. Relay 76 has contacts $76c_1$ and $76c_1'$ arranged so that press operation is discontinued when the relay 76 is energized thereby providing a fail-safe system for the mechanical press. Operative winding $76w$ also has a warning lamp 77 in parallel therewith to provide visual indication to the press operator that mechanical difficulty exists in the press.

Operation of the automatic controller for the pneumatic counterbalance system in cooperating with the ram adjustment motor 8 is similar to that operation heretofore described in conjunction with the main drive motor 5.

For this purpose, upon energization of the ram adjustment motor 8, one of the relays 56 and 57 is connected in the circuit, the relay 56 being energized concurrently by the motor controller $5a$ concurrently upon energization of the motor 8 for an upward adjustment, and the relay 57 being so connected for a downward adjustment.

In order to energize the ram adjustment motor 8 for either an upward or downward adjustment, the contact $100a$ of the two-position switch 100 must be in its closed position. Assuming now that the press operator desires to energize the adjustment motor 8 for an upward adjustment of the ram 2, the two-position selector switch 100 must first be positioned to close the contact $100a$. Thereupon, the push button switch 102 is depressed to cause concurrent closure of its contact $102a$ and the opening of its contact $102b$. Closure of contact $102a$ completes a circuit through the normally closed contacts 101, $103a$, $105c$ and $108c$ to energize the operating winding $106w$ and $56w$ of the relays 106 and 56, respectively. The opening of the contact $102b$ insures that the circuit to energize the windings $105w$ and $57w$ cannot be completed when the push button switch 102 is depressed. The relay 106 has its contact $106c$ in series with the winding $105w$ to further insure against deenergization of the relays 105 and 57 during an upward adjustment of the ram 2. The contactors 105 and 106 preferably are mechanically interlocked with each other. The relay 106 also has suitable contacts in the ram adjustment motor controller $8a$ electrically connected in the conventional manner in the adjustment motor circuit so as to cause the adjustment motor 8 to rotate in the direction for an upward adjustment of the ram 2. As has been previously explained, the relay 56 was energized concurrently with the energization of the contactor 106. Upon energization of relay 56 its contact $56c_3$ is closed, thereby closing a circuit through the winding $45w$ of relay 45. Thereupon, after a time delay to prevent impressing surges of starting the motor 8, the contact $45c$ is closed, and the contact $45cc$ is open. The contacts $56c$ will have closed and the contact $56c_1$ will have opened. This imposes voltage across the resistor 27 and the resistor 28 in series therewith. The input signal for the amplifier 22 is derived between the adjustable tap 25 of the resistor 27 and the terminal $28a$ of the resistor 28. Concurrently with the operation of its other contacts by relay 56, its contact $56c_2$ is closed. Upon upward movement of the ram and closure of contact $56c_2$, a circuit is established so that if excess current is derived from the secondary of transformer 1CT, the contact $61cc$ is closed, thereby establishing a circuit to energize the winding $72w$ of the relay 72. The function of relay 72 thereafter is the same as though the driving motor had been connected.

On the other hand, for downward adjustment of the ram 2 by the adjusting motor 8, with the contact $100a$ in its closed position, the push button switch 103 may be depressed thereby causing closure of its contacts $103b$ and concurrent opening of its contact $103a$. The closure of the contact $103b$ completes a circuit through the normally closed contacts 110, $102b$ and $106c$ for energization of the operating windings $105w$ and $57w$ of the relays 105 and 57, respectively. The relay 105 has its contact $105c$ in series with the winding $106w$ to insure against energization of the relays 106 and 57 during a downward adjustment of the ram 2. The opening of the contact $103a$ further insures that the circuit to the windings $106w$ and $56w$ cannot be completed when the push button switch 103 is depressed. The relay 105 also has contacts connected in the ram adjustment motor controller $8a$ in the conventional manner so as to cause the adjustment motor 8 to rotate in a direction for a downward adjustment of the ram 2 upon energization of the relay 105. Operation of the relay 57 causes the contacts $57c_2$ to close, thereby establishing a circuit so that upon closure of the contact $61c$, the winding $70w$ will be energized, whereupon the control functions the same as it functions in connection with the main driving motor. The limit switch contacts 101 and 110 limit the travel of the adjusting mechanism in the upward and downward directions, respectively, and will interrupt the circuit to the adjustment motor 8 when the maximum desired travel in either direction has been reached.

Thus, regardless of whether the ram is being operated on its forming cycle or lifted and lowered for adjustment, the motor current can be sampled and the counterbalancing means adjusted during each movement of the ram downwardly and each movement upwardly. Also, ram adjustment is readily effected. If the pressure is too high adjusting the ram upwardly results in its running away from the screw load and so requires only low motor current. Adjusting the ram downwardly results in running into the load, thus increasing the pressure and resulting in high motor current which energizes the solenoid $18w$. If the pressure is too low, adjusting the ram downwardly results in running away from the screw load with resultant low motor current whereas adjusting the ram upwardly results in running into the load which results in high motor current. This higher motor current energizes solenoid $17w$. This corrective functioning will continue as long as the motor is above normal and until the timer times out, whichever period is longer.

Having thus described my invention, I claim:

1. In a machine having a reciprocable driven member, an electric motor, means for connecting the motor to a source of voltage, power transmission means drivingly connecsting the motor to the member;

counterbalancing means connected to the member for imposing progressively increasing yieldable restraining force on the member opposing movement of the member in one direction and progressively decreasing driving force on the member for assisting movement of the member in the opposite direction;

adjusting means for adjusting said forces;

and control means operative in response to the amount of current being drawn by the motor exceeding a predetermined amount to render the adjusting means operative to vary said forces so as to balance them and thereby restore drawing of said current so said predetermined amount.

2. A structure according to claim 1 wherein the control means is responsive to the current at one position of the member along its path in one direction of reciprocation, and responsive to the current at another position of the member along its path in the opposite direction of reciprocation.

3. A structure according to claim 2 wherein the one position is at the end of substantially one half of the travel of the member in said one direction and the other position is at the end of substantially one half of the travel of the member in said opposite direction.

4. A structure according to claim 1 wherein the counterbalancing means are expansible and contractible piston and cylinder means, the adjusting means include an admission valve and a blow down valve, a pneumatic circuit connects the piston and cylinder means at one end to the admission valve adapted for connection to a source of air under pressure and at the same end to the blow down valve, and said control causes the blow down valve to vent air from said end of the piston and cylinder means if the amount exceeds said predetermined amount during movement of the member in said one direction, and causes the admission valve to admit more air to the said end of the piston and cylinder means if the current exceeds said predetermined amount during movement of the member in said opposite direction.

5. A structure according to claim 4 wherein means are provided which are rendered operable by the drawn current when it exceeds the predetermined amount during both movement in said one direction and the consecutive return in the opposite direction to stop the press.

6. An apparatus for counterbalancing the force of an electric motor driven reciprocating member, comprising pneumatic piston and cylinder means operatively connected to the member for resisting movement of the member in one direction by compression of the air in the piston and cylinder means by operation of the piston and cylinder means by the member, and assisting movement of the member in the opposite direction by expansion of the air so compressed, sampling means for periodically sampling the current being drawn by the motor for each direction of movement of the member, and means responsive to the sampling means for adjusting the air pressure of the counterbalancing means to reduce the current being drawn when the current is in excess of a predetermined amount.

7. In combination, an upright press including a frame having a bed, a vertically reciprocable ram, an electric motor, transmission means driven by the motor and including a crank drivingly connected to the ram, a pneumatic piston and cylinder assemblage having a piston member and a cylinder member, one of said members being connected to the frame, and the other to the ram for reciprocation therewith, whereby the air in one end of the assemblage is compressed as the ram descends and expands as the ram ascends, a blow down valve connected to said one end and to the atmosphere, an admission valve adapted for connection to a source of air under pressure connected to the same end, means operable to sample the current being drawn by the motor when the crank has been rotated substantially 90 degrees and 270 degrees, respectively, from its starting position, and means operative when the current being drawn exceeds a predetermined normal amount at the 90 degree position, to open the blow down valve for a predetermined interval, and when the current being drawn exceeds a predetermined normal amount at the 270 degree position, to open the admission valve for a predetermined interval.

8. The structure according to claim 7 wherein said intervals are time intervals.

References Cited in the file of this patent

UNITED STATES PATENTS

| | | |
|---|---|---|
| 982,627 | Newton | Jan. 24, 1911 |
| 1,774,245 | Strout | Aug. 26, 1930 |
| 2,784,665 | Georgeff | Mar. 12, 1957 |
| 2,857,157 | Bonquet | Oct. 21, 1958 |